UNITED STATES PATENT OFFICE.

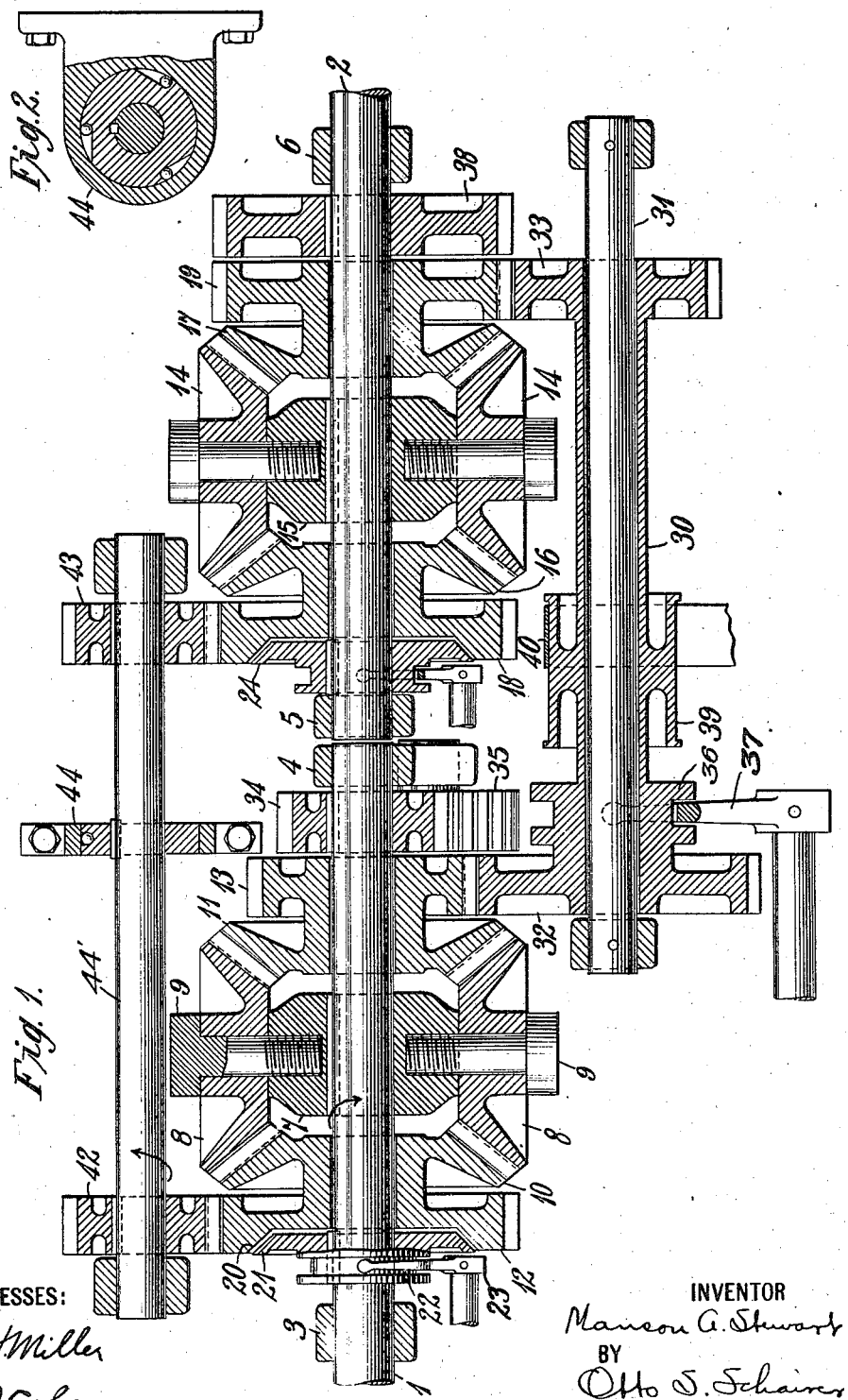

MANSON A. STEWART, OF YANKTON, SOUTH DAKOTA.

SPEED-CHANGING-GEAR MECHANISM.

1,228,984.  Specification of Letters Patent.  Patented June 5, 1917.

Application filed March 27, 1914. Serial No. 827,574.

*To all whom it may concern:*

Be it known that I, MANSON A. STEWART, a citizen of the United States, and a resident of Yankton, in the county of Yankton and State of South Dakota, have invented a new and useful Improvement in Speed-Changing-Gear Mechanisms, of which the following is a specification.

My invention relates to speed changing gear mechanisms, and it has for its object to provide mechanism in which changes in the ratio of the speeds respectively of the driving and driven shafts may be effected without meshing and demeshing of gears, thereby avoiding the possibility of clashing and breaking of the gears, and also without interruption or loss of the driving power.

My invention is illustrated in the accompanying drawing Figure 1 of which is a sectional plan view of a transmission mechanism embodying the same, and Fig. 2 is a side view of one of the clutches constituting a part of the mechanism of Fig. 1.

The mechanism comprises a driving shaft 1 and a driven shaft 2 that are arranged in alinement and are provided with suitable bearings 3, 4, 5 and 6. Keyed upon the driving shaft 1 is a hub 7 that carries a set of bevel planetary gears 8, the said gears being mounted upon suitable pins or stub shafts 9 that are carried by the hub 7. The planetary gears 8 mesh with two other bevel gears 10 and 11 that are loosely mounted upon the shaft 1 and that are formed integral with, or are otherwise arranged to rotate with, spur gears 12 and 13 respectively, the latter gears being of different diameters.

Associated with the driven shaft 2 is another set of gears arranged in a manner similar to those associated with the driving shaft 1, the said set of gears comprising planetary gears 14 that are carried by a hub 15 that is keyed to the shaft 2, bevel gears 16 and 17 meshing therewith upon opposite sides thereof, and spur gears 18 and 19 respectively arranged for rotation with gears 16 and 17.

The gear 12 is adapted to be directly connected to, and to be driven by, the driving shaft 1 by means of a suitable friction clutch comprising a member 20 formed integral with, or carried by, the gear 12, and a member 21 that is splined upon the shaft 1 and is adapted to be moved longitudinally thereof by means of a shift collar 22 and a forked member 23. A similar friction clutch 24 is provided for directly connecting the gear 16 to the driven shaft 2. The purpose of the friction clutches is to cause the gears 10, 11, 12 and 13 in the one case, and the gears 16, 17, 18 and 19 in the other, to rotate simultaneously with the shafts with which they are respectively associated.

The gear 13 is adapted to drive gear 19 by means of a sleeve 30 that is mounted upon, and is movable longitudinally of, a shaft or rod 31, and two gears 32 and 33 that are mounted upon opposite ends of the sleeve 30, the gear 32 meshing with the gear 13 and the gear 33 meshing with the gear 19. Keyed upon the driving shaft 1 adjacent to the gear 13 is a gear 34 that meshes with a suitably mounted idler gear 35 with which the gear 32 may be caused to engage by the movement of the sleeve 30 longitudinally of the shaft 31, which longitudinal movement may be effected by means of a shift collar 36 and a forked member 37. The longitudinal movement of the sleeve 30 also causes the gear 33 to mesh with a gear 38 that is keyed upon the driven shaft 2. When the sleeve 30 is moved so as to cause the gear 32 to mesh with the gear 35 and the gear 33 with the gear 38, the driven shaft 2 rotates at a relatively low speed and in the opposite direction to the driving shaft 1. The sleeve 30 is also provided with a brake drum 39 that is engaged by a brake band 40 whereby rotation of the sleeve 30 and the gears 32 and 33 may be prevented.

The gear 12 is adapted to drive the gear 18 by means of gears 42 and 43 that mesh respectively therewith and are mounted upon a counter shaft 44' that is free to rotate in a counter clockwise direction, when viewed from its left end, but is prevented from rotating in a clockwise direction by any suitable means such as an overrunning clutch 44 of the roller or ball type, such as that illustrated.

In the operation of the device the engine or driving shaft 1 rotates in a clockwise direction and carries with it the hub 7 and the planetary gears 8. Since the driving ratio between the gears 11 and 17, provided by the gears 13, 32, 33 and 19, is less than that provided between the gears 10 and 16 by the gears 12, 42, 43 and 18, it is obvious that the gears 10 and 11 will be driven in a clockwise direction by the planetary gears 8 at speeds that are dependent upon the said driving ratios. The gears 10 and 11 rotate in a clockwise direction and turn the gears 42 and 32 in a counter clockwise direction, and the shaft 2 is driven in the same direction. The gears 18, 16, 19 and 17 are, accordingly, driven in a clockwise direction by means of the planetary gears 14. The clutch 44 prevents the gear 43 from rotating in a clockwise direction and the gears 16 and 18 from rotating in a counter clockwise direction. The shaft 2 is then driven at low speed in the same direction as the shaft 1.

In order to cause the shaft 2 to be driven at high speed the brake 39—40 should be set in order to prevent rotation of the gears 32 and 33 and also the gears 11 and 17, under which condition the planetary gears 8 drive the gears 10 and 12 in a clockwise direction, the gears 42 and 43 in a counter clockwise direction, and the gears 16 and 18 in a clockwise direction. The gear 16 then drives the shaft 2 through the planetary gears 14 in a clockwise direction.

If the gears 16 and 18 are caused to rotate with the shaft 2 by means of the clutch 24, the said shaft will be driven jointly by the gears 33 and 43, but since the gear 33 rotates faster than the gear 43, the speed of the shaft 2 will be nearer the low speed obtained when all of the clutch and brake devices are released than the high speed obtained when the gears 32 and 33 are held stationary.

Similarly, if the gears 10 and 12 are caused to rotate with the shaft 1 by the clutch 20—21 the shaft 2 will again be driven jointly by the gears 33 and 43, but in this case the speed of the shaft 2 is closer to the high speed than low.

It will be noted that the several speed changes may be effected without meshing and demeshing of the gears, and also without interrupting the driving connection between the engine and the driven shafts.

In order to obtain reversed rotation of the shaft 2 with respect to the shaft 1, it is only necessary to move the sleeve 30 longitudinally to cause gears 35 and 32 to mesh and also to cause gears 33 and 38 to mesh, as before described.

Although I have illustrated and described my invention in a single simple embodiment, it will be readily understood that it may be employed in other forms and adapted to other uses within the scope of the claims and without departing from the spirit of the invention.

I claim as my invention:—

1. Speed changing gear mechanism comprising a driving shaft, a driven shaft, two sets of planetary gears respectively revoluble with said shafts, two gears meshing with each of said sets of planetary gears, and operative connections between each gear meshing with one set of planetary gears and a corresponding gear meshing with the other set.

2. Speed changing gear mechanism comprising a driving shaft, a driven shaft, two sets of planetary gears respectively revoluble with said shafts, two gears meshing with each of said sets of planetary gears, and operative connections between each gear meshing with one set of planetary gears and a corresponding gear meshing with the other set, the speed ratios of said operative connections being different.

3. Speed changing gear mechanism comprising a driving shaft, a driven shaft, two sets of planetary gears respectively revoluble with said shafts, two gears meshing with each of said sets of planetary gears, operative connections between each gear meshing with one set of planetary gears and a corresponding gear meshing with the other set, means for preventing rotation of one set of the operatively connected gears in one direction, and means for braking the other set of operatively connected gears.

4. Speed changing gear mechanism comprising a driving shaft, a driven shaft, two sets of planetary gears respectively revoluble with said shafts, two gears meshing with each of said sets of planetary gears, and operative connections between each gear meshing with one set of planetary gears and a corresponding gear meshing with the other set, and means for causing one of the gears meshing with each set of planetary gears to rotate with the shaft that revolves the said planetary gears.

5. Speed changing gear mechanism comprising a driving shaft, a driven shaft, two sets of planetary gears respectively revoluble with said shafts, two gears meshing with each of said sets of planetary gears, and operative connections between each gear meshing with one set of planetary gears and a corresponding gear meshing with the other set, and means for causing one of the gears meshing with one set of planetary gears to rotate with the shaft that revolves the said planetary gears.

6. Speed changing gear mechanism comprising a driving shaft, a driven shaft, two sets of planetary gears respectively revoluble with said shafts, two primary gears meshing with each of said planetary gears, secondary gears respectively driven by the primary gears, two counter-shafts, and gears carried thereby that mesh respectively with the said secondary gears and operatively connect them in pairs.

7. Speed changing gear mechanism comprising a driving shaft, a driven shaft, two sets of planetary gears respectively revoluble with said shafts, two primary gears meshing with each of said planetary gears, secondary gears respectively driven by the primary gears, two counter-shafts, and gears carried thereby that mesh respectively with the said secondary gears and operatively connect them in pairs, the speed ratios of said operatively connected pairs of gears being different.

8. Speed changing gear mechanism comprising a driving shaft, a driven shaft, two sets of planetary gears respectively revoluble with said shafts, two primary gears meshing with each of said planetary gears, secondary gears respectively driven by the primary gears, two counter-shafts, gears carried thereby that mesh respectively with the said secondary gears and operatively connect them in pairs, means for preventing rotation of one set of the operatively connected gears in one direction, and means for braking the other set of operatively connected gears.

9. Speed changing gear mechanism comprising a driving shaft, a driven shaft, two sets of planetary gears respectively revoluble with said shafts, two primary gears meshing with each of said planetary gears, secondary gears respectively driven by the primary gears, two counter-shafts, gears carried thereby that mesh respectively with the said secondary gears and operatively connect them in pairs, reverse gears carried respectively by the driving and driven shafts, an idler gear in mesh with one of them, and means for moving the gears upon one counter shaft respectively into mesh with the idler gear and one of the reverse gears.

10. Speed changing gear mechanism comprising a driving shaft, a driven shaft, two sets of planetary gears respectively revoluble with said shafts, two gears meshing with each of said sets of planetary gears, operative connections between each gear meshing with one set of planetary gears and a corresponding gear meshing with the other set, and means for braking one set of the operatively connected gears.

In testimony whereof, I have hereunto subscribed my name this seventeenth day of February 1914.

MANSON A. STEWART.

Witnesses:
ALICE E. JONES,
ALBERT J. DOW.